May 15, 1956   F. E. CARROLL, JR   2,745,424
OIL TANK OR LIKE VALVE
Filed June 9, 1954   2 Sheets-Sheet 1

INVENTOR
FRANK E. CARROLL JR
BY
HIS ATTORNEY

May 15, 1956 F. E. CARROLL, JR 2,745,424
OIL TANK OR LIKE VALVE
Filed June 9, 1954 2 Sheets-Sheet 2
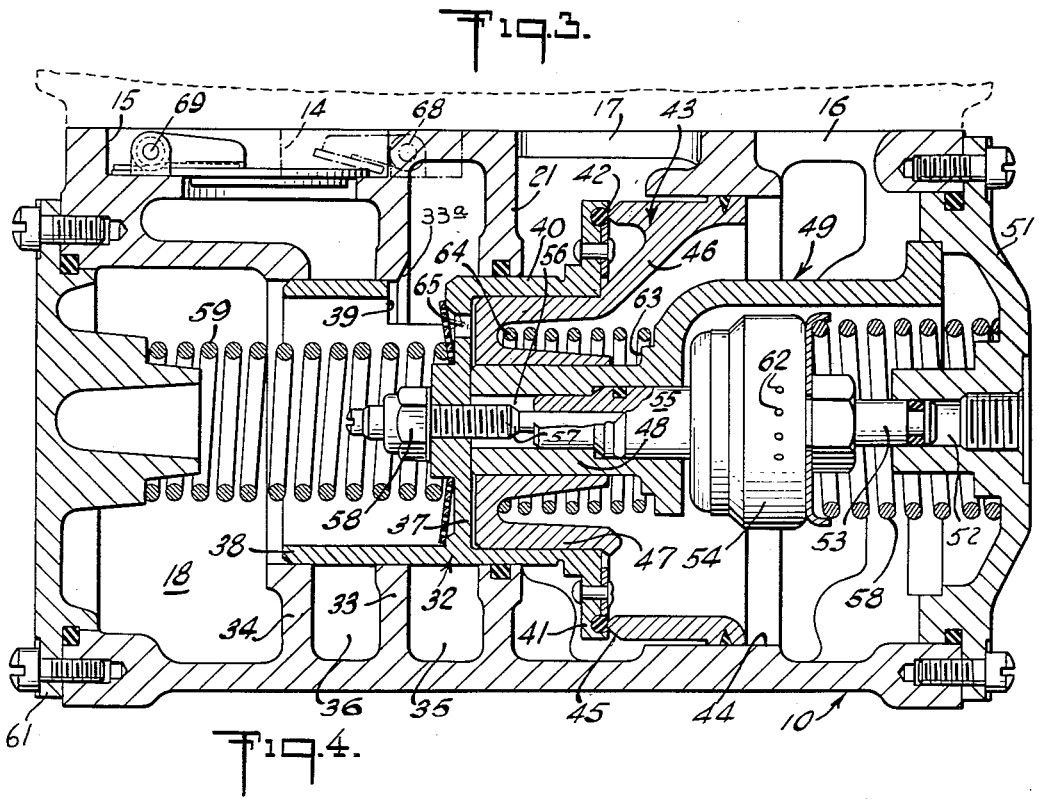
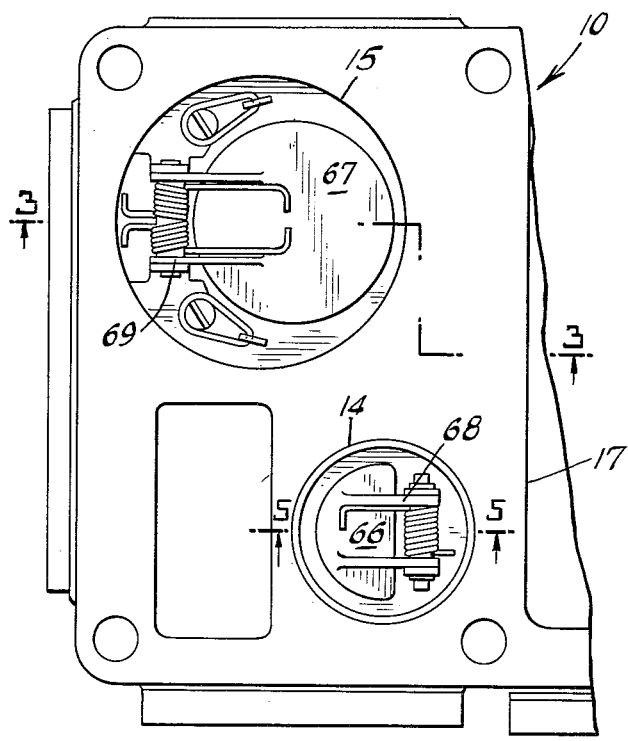
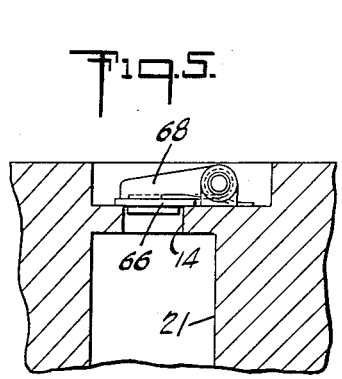
INVENTOR
FRANK E. CARROLL JR.
BY 
HIS ATTORNEY

United States Patent Office 2,745,424
Patented May 15, 1956

2,745,424

OIL TANK OR LIKE VALVE

Frank E. Carroll, Jr., Dayton, Ohio, assignor to United Aircraft Products, Inc., Dayton, Ohio, a corporation of Ohio Application June 9, 1954, Serial No. 435,560

10 Claims. (Cl. 137—89)

This invention relates to valve assemblies and particularly to an oil tank or like valve as used in the engine lubricant circulating systems of aircraft and the like, which systems include an oil tank holding the main body of make-up oil and further include a hopper defining a short circuit path through the tank whereby oil drawn from the engine may be recirculated without having to be mixed with the main body of oil in the tank.

It is generally an object of valve assemblies of the class described to furnish completely automatic control of oil movements into and out of the tank, and tank hopper, during warm up and operating periods, during dilution and when the engine is shut down. Primary response of the automatic controls is to a changing condition of the oil, as for example, temperature.

The instant invention is concerned primarily with the valve assembly as it functions to control flow out of the tank, it being an object of the invention to maintain a continuously open path for flow of make-up oil out of the tank during operation of the system.

More particularly, it is an object to introduce a pre-opening principle in oil tank or like valves by which the flow path out of the tank is opened immediately upon starting of the engine and irrespective of the temperature of the oil.

A further object of the invention is to introduce auxiliary valve means in the valve assembly effective to prevent flow into the tank or hopper until the above mentioned pre-opening operation has taken place, it being an accessory object in this connection to establish and maintain a minimum pressure difference between compartments of the valve assembly which pressure difference is utilized to cause the pre-opening operation.

Other objects and structural details of the invention will appear from the following description when read in connection with the accompanying drawing; wherein:

Fig. 3 is a view in longitudinal section of the valve assembly of Fig. 2;

Fig. 4 is a fragmentary view in top plan, of the valve assembly of Figs. 2 and 3; and Fig. 5 is a detail view in cross section taken substantially along the line 5—5 of Fig. 4.

Figure 1:
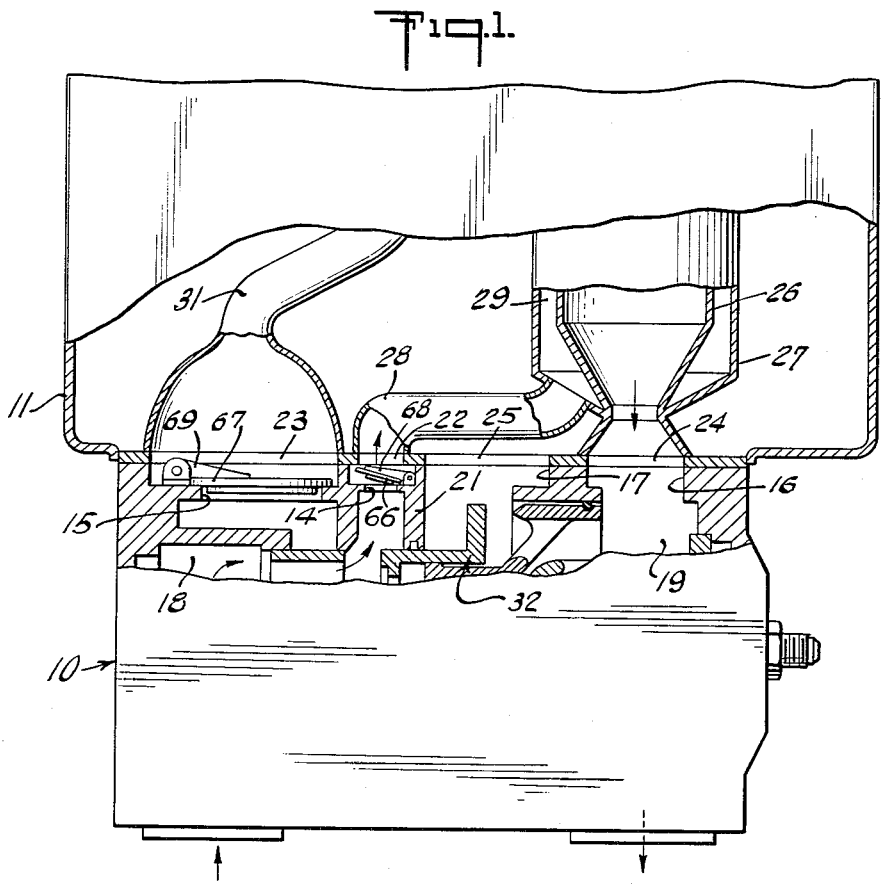
Fig. 1 is a diagramamtic view of an oil tank and valve combination in accordance with the illustrated form of the invention.
Figure 2:
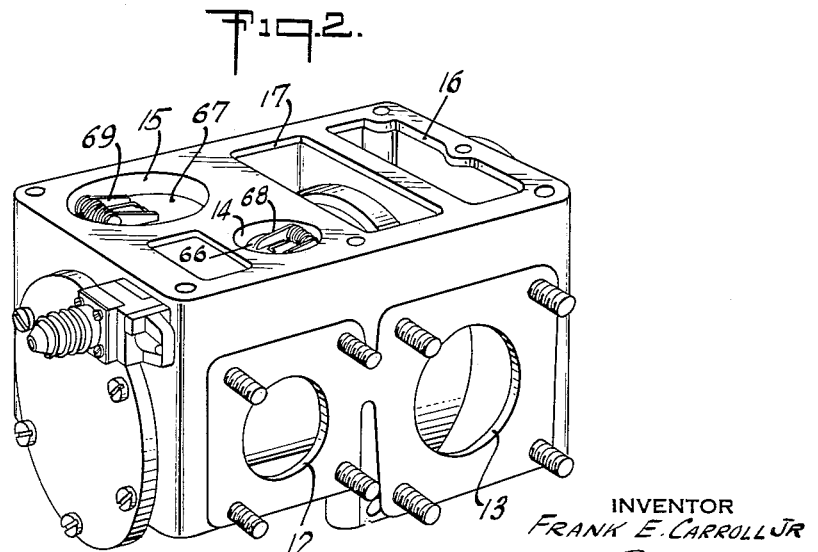
Fig. 2 is a view in perspective of a valve assembly in accordance with the illustrated form of the invention.

Referring to Figs. 1 and 2 of the drawing, an oil tank or like valve in accordance with the illustrated form of the invention comprises a valve housing 10 adapted to be fastened in a suitable manner to the underside of a tank 11. On one side of the housing 10 are inlet and outlet ports 12 and 13 respectively, the former being connected in a pipe line leading from the engine and the latter being connected in a pipe line leading to the engine. On the top side of the valve housing 10, or that side in facing adjacent relation to the tank 11, is a first pair of openings 14 and 15 and a second pair of openings 16 and 17. The pair of openings 14 and 15 and the opening 12 communicate with one another through an internal chamber 18 which may be termed the inlet chamber. The pair of openings 16 and 17 and the opening 13 communicate with one another through an internal chamber 19 which may be termed the outlet chamber. The chambers 18 and 19 are in part defined by and are located on opposite sides of a central partition 21 in the housing 10. Mounted on the tank 11 the openings 14—17 register with corresponding openings 22—25 in the bottom of the tank.

The opening 24 in the tank underlies a hopper assembly comprising inner and outer shells 26 and 27 standing in an upright position in the tank 11 in a nested concentric relation to one another. The inner shell 26 extends through and beyond the bottom of the outer shell 27 so that opening 24 and valve opening 16 communicate directly with the interior of the inner shell 26.

The opening 22 in the bottom of the tank 11 is connected as by a conduit 28 to the bottom of the outer shell 27 of the hopper assembly, the shells 26 and 27 being radially spaced apart in a manner to define therebetween an annular passage 29. The opening 23 in the tank 11 is connected as by a conduit 31 to the interior of the tank above the oil level. The opening 25 in the housing 11 communicates with the interior of the tank 11 at the bottom thereof.

According to the construction and arrangement of parts, therefore, oil from the engine is admitted by the opening 12 to the inlet chamber 18 of the valve housing 10 and is constrained to leave such chamber by way of either one or both of the openings 14 and 15, which may be termed exit ports. The conduits 28 and 31 define dual paths for the flowing liquid. In the case of conduit 28 the oil is conducted thereby to annular hopper passage 29 and rises therein until, in a manner not shown herein, it spills over the upper edge of the inner shell 26. Within the shell 26 the oil descends and flows out of the hopper and into the chamber 19 of the housing 10 by way of registering openings 24 and 16. In the case of conduit 31 the oil is directed thereby to the upper part of the tank and discharged into the main body of oil. At the same time, a like quantity of oil may be permitted to flow through the opening 25 and opening 17 into the chamber 19 of the valve housing. Whether the oil reaches the chamber 19 by way of valve opening 16 or valve opening 17 it passes out of the valve housing 10 by way of opening 13 and is returned for reuse in the engine.

Flow out of the chamber 18 by way of the exit ports 14 and 15 is controlled by a diverter valve element 32, shown more particularly in Fig. 3. The element 32 is constructed as an open ended cylinder and has a sliding mounting in the partition wall 21 and in internal housing ribs 33 and 34 in the inlet chamber 18, the rib 33 defining with the partition 21 an annular chamber 35 communicating with exit port 14, and defining with rib 34 an annular chamber 36 communicating with exit port 15. The diverter valve element is centrally partitioned by a vertical wall 37. Extending in one direction from the wall 37 and into the inlet chamber 18 is a cylindrical formation 38 having on its periphery a valve face in which is an opening 39.

In response to longitudinal adjustment of the diverter valve element the opening 39 is brought selectively to registry with the annular chamber 35 or with the chamber 36 or to an intermediate position overlapping the rib 33 in which it communicates with both chambers 35 and 36. The end of cylindrical portion 38 being open, it will be understood that oil entering inlet chamber 18 by way of opening 12 will be directed by the diverter valve element 32, in accordance with the position thereof, either to the annular chamber 35 and thence to the hopper assembly or to the annular chamber 36 and thence to the tank proper, or a part of the flow may go to the chamber 35 and another part to the chamber 36.

Extending in the opposite direction from the wall 37, into the outlet chamber 19, is a cylindrical portion 40 terminating in a radial flange 41 on which is a valve face 42. A segregator valve element 43 is slidably mounted on an internal housing slideway 44 and has a valve face 45 engageable with the valve face 42 on the flange 41 of the diverter valve element. The segregator element 43 further has a spider portion 46 interconnecting the valve face 45 and a piston 47 received in the cylindrical portion 40 of the diverter valve element, the interior of such latter portion serving as a piston chamber.

Within the portion 40 the piston 47 has a sliding bearing on a tubular projction 48 on a thermostat cage 49. From its cooperative engagement with the segregator element 43, at its one end, the thermostat cage 49 extends to a mounting in a closure cap 51 at its other end.

The closure cap 51 is formed with a central through bore 52, one end of which is adapted to be connected in a diluent supply line and the other end of which receives the shank 53 of a thermostat case 54. A sleeve 55 is connected to the case 54 and projects from the opposite end thereof into a bore 56 in the tubular projection 48 on the cage 49. Within the case 54 is a thermal material having the property of expansion under applied heat. The expansive force is exerted against a plunger 57 which extends through and beyond the sleeve 55, its outer end being threaded into engagement with the partition wall 37 of the diverter valve element 32, the connection so afforded being made secure by a lock nut 58.

The thermostat case 54 is contained in the cage 49 which has openings for free access of the oil in the chamber 19 to the thermostat case, the oil in effect washing the thermostat case as it moves from the interior of the chamber 19 out of the valve housing by way of the opening 13. A relatively strong spring 58 is seated on the closure cap 51 and holds the thermostat case in the position of Fig. 3, overcoming a relatively weaker spring 59 which is seated on an oppositely disposed closure cap 61 and bears on the partition wall 37. It will be understood that an increasing oil temperature in the chamber 19 heats and expands the thermal material in the case 54. Motion of the case rearward, or to the right as viewed in Fig. 3, is inhibited by strong spring 58. Accordingly, the expansive force of the thermal material is applied in a direction to extend the plunger 57 outward or to the left, resulting in a shifting of the diverter valve element 32 in the same direction. The spring 59 is utilized to return the diverter valve element in the opposite direction, and to recompress the thermal material in the case 54, in response to a cooling of the oil. The spring 58 will yield in the event of excess or surge pressures in the inlet chamber 18, permitting the diverter valve element and the thermostat mechanism to move as a unit in a rearward or right hand direction.

Diluent introduced into the valve housing by way of the bore 52 in cap 51 flows by way of shank 53 into the interior of the thermostat case 54 where it may contact the thermal material contained therein substantially to the exclusion of the oil. The diluent leaves the case 54 by way of radial opening 62 therein and mixes with the oil leaving the valve housing by way of opening 13. The thermal material in the case 54 is cooled by the diluent, with resultant effect upon the diverter valve element irrespective of the temperature of the oil.

Returning to the segregator valve element 43, a limit shoulder therefor is provided at 63 on the cage 49. A compression spring 64 is interposed between the cage 49 and the segregator element and is effective to urge the element away from the shoulder 63 in a manner to engage the valve face 45 thereon with the valve face 42 on the diverter valve element. With these valve faces so engaged flow to the outlet chamber 19 by way of the opening 17 is prevented. Motion of the segregator element in the opposite direction against the urging of spring 64 is accomplished by fluid pressure, there being an opening 65 in the partition wall 37 whereby the pressure difference between the inlet chamber 18 and the outlet chamber 19 is applied across the piston portion 47 of the segregator valve element.

The exit ports 14 and 15 are controlled by inwardly closing outwardly opening check valves 66 and 67 seated in respective recesses in the top side of the valve housing and urged to closed position by respective spring assemblies 68 and 69. The spring loading of these valves is predetermined, particularly in the case of valve 66 to prevent flow out of the inlet chamber 18 until a predetermined high pressure differential is achieved between the inlet and outlet chambers sufficient to overcome the spring 64. The construction and arrangement of parts is such that when the engine is started and oil under pressure flows into the chamber 18, the check valve 66 will impose a resistance to flow of the oil out of the port 14 except at a relatively high pressure adequate to move the segregator element 43 against the urging of spring 64. The segregator element is normally removed or spaced from the shoulder 63, as indicated in Fig. 3. At the start of an engine operation, however, and in response to creation of the aforementioned pressure differential the segregator element moves to the right as viewed in Fig. 3, until limited by engagement with the shoulder 63, this motion serving to separate the valve faces 42 and 45 and thereby to open flow through the port 17 out of the bottom of the tank. At all times during engine operation, therefore, the way is open for make-up oil to pass out of the storage tank and into the circulating oil line.

Structural details of the valve assembly disclosed but not claimed herein are claimed in the application of Walter H. Geddes, Ser. No. 257,163, filed November 19, 1951, for Oil Tank or Like Valve, now Patent No. 2,725,069, dated November 29, 1955. Reference is also made to that application for a disclosure of details of the thermostat mechanism and for a description of the general mode of operation of the valve. Briefly considering the mode of operation of the valve, however, when the engine oil is unheated and the engine idle, the parts assume the position shown in Fig. 3. When the engine is started the oil returning from the engine enters inlet chamber 18 of the valve assembly and is directed by the diverter valve element 32 to the exit port 14 where it forces check valve 66 open and passes by way of conduit 28 to the hopper assembly. At the same time, as above mentioned, a pressure differential is applied across the segregator element 43 to open a path out of the bottom of the tank for make-up oil. The oil flowing through the hopper assembly is returned to the valve assembly by way of opening 16 therein and discharged into outlet chamber 19 where it washes the thermostat case 54 and continues on out of the valve assembly by way of opening 13, being directed by suitable pipe lines back to the engine. As the temperature of the oil so circulated increases, the thermostat mechanism is effective as before described, to move the diverter valve element 32 outward or to the left as seen in Fig. 3. This motion is continued until a predetermined temperature value is achieved by which time the opening 39 in the diverter element has moved out of registry with annular chamber 35 and into registry with annular chamber 36. A chamfer 33ª provides a means for some oil flow to return through annular passage 29 to the hopper and thence out opening 24. This minute oil flow acts as an air seal in the hopper. Hence no air will be sucked through the hopper and thence to the engine, causing engine oil pump cavitation. The oil returning from the engine now is principally directed to the tank and minutely to the hopper assembly and oil is supplied to the system principally out of the tank by way of the opening 17 in the valve assembly.

In the event of dilution, the thermostat is cooled, causing a retraction of the diverter valve element to the position of Fig. 3 wherein the oil flow is returned to the hopper assembly. During dilution, therefore, only a relatively small amount of oil in the system is diluted. Following dilution, the engine usually is shut down. The engine oil is still hot, however, and the thermostat will extend the diverter valve element outward to a normal running position for an interval before it is retracted as the oil cools. Flow of the relatively dense oil in the tank into the system line is precluded in this interval by the segregator element 43, the valve face 45 of which reengages the valve face 42 immediately that the pressure in the system is reduced by shutting off of the engine.

It will be understood that the tank and hopper mechanism here disclosed is merely illustrative and that the valve assembly may be used with other structures having the same function in the system.

What is claimed is:

1. An oil tank or like valve, including a valve housing having a partition separating the interior thereof into inlet and outlet chambers, a diverter valve element slidably mounted in said partition and having a valve face in said inlet chamber and another valve face in said outlet chamber, first and second exit ports in said housing communicating with said inlet chamber and controlled by the first said valve face, first and second return ports in said housing communicating with said outlet chamber, a segregator valve element having a valve face engageable with the said other valve face on said diverter valve element to deny return flow by way of one of said entrance ports, said segregator valve element being movable relatively to said diverter valve element to engage and disengage the said valve faces thereon, spring means urging said segregator valve element in a direction to engage the valve face thereon with the said other valve face on the diverter valve element, means for applying the pressure difference between said inlet chamber and said outlet chamber to said segregator valve element in a manner to oppose said spring means, and a spring loaded check valve installed in said first exit port defining a minimum value for said pressure difference exceeding the resistance of said spring means to compression, said diverter valve element having a normal position opening said first exit port and closing said second exit port.

2. An oil tank or like valve according to claim 1, characterized by a relatively stationary limit shoulder for said segregator element, said element being normally spaced from said shoulder under the urging of said spring means and moving to said shoulder in response to the attaining of a pressure difference between said inlet and outlet chambers corresponding to said minimum value.

3. An oil tank or like valve, including a valve housing having a partition separating the interior thereof into inlet and outlet chambers, there being an inlet opening for oil under pressure to said inlet chamber and an outlet opening from said outlet chamber, first and second exit ports in said housing communicating with said inlet chamber, first and second entrance ports in said housing communicating with said outlet chamber, a diverter valve element slidably mounted in said partition and having a first valve face in said inlet chamber controlling flow through said exit ports and having a second valve face in said outlet chamber, a first spring means tending to hold said diverter valve element normally in position opening said first exit port and closing said second exit port, means responsive to a changing condition of the oil for moving said diverter valve element in the opposite direction to close said first exit port and to open said second exit port, a segregator valve element in said outlet chamber having a valve face engageable with said second valve face on said diverter valve element to deny flow into said outlet chamber by way of the first said entrance port, a second spring means subordinate in strength to the first said spring means urging said segregator valve element to a following relation to said diverter valve element, means defining a relatively stationary limit shoulder for said segregator valve element, said element being movable off said seat by said spring means to engage the valve face thereon with said second valve face on said diverter valve element, and means for applying the pressure difference between said inlet and outlet chambers to said segregator element in a direction to move said element to said shoulder.

4. An oil tank or like valve according to claim 3, characterized by a spring loaded check valve in said first exit port establishing and defining a minimum pressure difference sufficient to overcome said second spring means.

5. An oil tank or like valve according to claim 4, in combination with an oil tank having a hopper and a main storage or make up compartment outside the hopper, said first and second exit ports communicating with said hopper and said storage compartment respectively and said first and second entrance ports communicating with said storage compartment and said hopper respectively.

6. An oil tank or like valve, including a valve housing having an inlet chamber and an outlet chamber, exit and entrance ports communicating with said inlet chamber and outlet chamber respectively, a diverter valve element slidably mounted in said housing to control flow out of said inlet chamber and having a valve face in said outlet chamber, means defining a piston chamber in said diverter valve element, a segregator element having a piston portion received in said chamber and a valve face engageable with the said valve face on said diverter valve element by an inward motion of said piston portion in said piston chamber and disengageable therefrom by an opposite motion of said piston portion, whereby to control flow into said outlet chamber by way of an entrance opening therein, means for moving said diverter valve element, said means defining a normal retracted position for said diverter valve element, a relatively stationary limit shoulder for said segregator element, said segregator element being movable to engage said shoulder and disengage said valve faces in the retracted position of said diverter valve element, and spring means opposing such motion and tending normally to maintain said valve faces engaged, said piston chamber being open to communication with said inlet chamber, admitted pressure fluid acting on said piston portion in opposition to said spring means.

7. An oil tank or like valve according to claim 6, characterized by inwardly closing outwardly opening check valve means installed in an exit port from said inlet chamber spring loaded to prevent flow through said port except at a predetermined high pressure difference on opposite sides thereof.

8. A valve assembly for controlling fluid flow through dual paths, said valve assembly comprising a valve body having inlet and outlet chambers formed therein, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet for said outlet chamber, valve means for regulating fluid flow through said second, third and fourth ports, said valve means including a diverter valve and a segregator valve mounted for co-axial relative movement in said valve body, said diverter valve having a valve face positioned in said inlet chamber in cooperative relation with said second and third ports to vary, by its axial movement, the distribution of fluid flow between said second and third ports, said diverter and segregator valves having cooperating valve faces positioned in said outlet chamber adjacent to said fourth port to regulate, by relative axial movement of said diverter and said segregator valve, the fluid flow through said fourth port, spring means operatively associated with said diverter and segregator valves and biased to urge said diverter and segregator valves together to close said fourth port, the opposite sides of said segregator valve being exposed to fluid pressures in said inlet and outlet chambers respectively whereby a differential pressure in said inlet and outlet chambers tends to urge said diverter and segregator valves apart to open said fourth port, and check valves on said second and third ports spring loaded to maintain the pressure difference between said inlet and outlet chambers at or above the value necessary to overcome said spring means.

9. A valve assembly for controlling fluid flow through dual paths, said valve assembly comprising a valve body having an internal partition forming inlet and outlet chambers within said valve body, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively and a sixth port providing an outlet for said outlet chamber, valve means for regulating fluid flow through said second, third and fourth ports, said valve means including a diverter valve comprising a sleeve extending through said partition and axially movable therein, said diverter valve sleeve having a first valve face positioned in said inlet chamber in cooperative relation with said second and third ports to vary by its axial movement the distribution of fluid flow between said second and third ports, said diverter valve sleeve also having a second valve face within said outlet chamber, said diverter valve having an internal transverse partition defining with said diverter valve sleeve a cylindrical chamber, a segregator valve coaxial with said diverter valve and mounted for sliding movement within said cylindrical chamber, said segregator valve having a valve face positioned to cooperate with the second valve face of said diverter valve sleeve and with said fourth port to vary the degree of opening of said fourth port, spring means operatively associated with said segregator valve and biased to urge said valve toward said diverter valve partition, said diverter valve partition being provided with an opening therethrough, whereby said segregator valve is responsive to the pressure in said inlet chamber, and check valves on said second and third ports spring loaded to maintain the pressure difference between said inlet and outlet chambers at or above the value necessary to overcome said spring means.

10. A valve assembly for controlling fluid flow through dual paths, said valve assembly comprising a valve body having inlet and outlet chambers formed therein, said valve body also having a first port providing an inlet to said inlet chamber, a second and third port communicating with said inlet chamber and adapted to be connected to the inlet ends of said dual paths respectively, a fourth and fifth port communicating with said outlet chamber and adapted to be connected to the discharge ends of said dual paths respectively, and a sixth port providing an outlet from said outlet chamber, a bracket within said outlet chamber, a thermostat mounted in said bracket and having an arm extending into said inlet chamber, said arm being axially movable by said thermostat in response to temperature changes in said outlet chamber, first spring means interposed between said thermostat and a wall of said outlet chamber and biased to urge said thermostat toward said inlet chamber, said bracket being provided with a stop to limit movement of said thermostat by said spring means, valve means including a diverter valve and a segregator valve mounted for co-axial relative movement in said valve body, said diverter valve having a valve face positioned in said inlet chamber in cooperative relation with said second and third ports to vary by its axial movement the distribution of fluid flow between said second and third ports, said diverter valve being connected to said thermostat arm, said diverter and segregator valves having cooperating valve faces positioned in said outlet chamber adjacent to said fourth port to regulate by relative axial movement of said diverter and segregator valves the fluid flow through said fourth port, second spring means interposed between said diverter valve and a wall of said inlet chamber and biased to urge said diverter valve toward said segregator valve, and third spring means interposed between said segregator valve and said bracket to urge said segregator valve being exposed on its opposite sides to the pressures in said inlet and outlet chambers respectively and said third spring means being relatively weaker than said second spring means, whereby a differential pressure between said inlet and outlet chambers tends to urge said segregator valve away from said diverter valve to open said fourth port, and check valves on said second and third ports spring loaded to maintain the pressure difference between said inlet and outlet chambers at or above the value necessary to overcome said spring means.

References Cited in the file of this patent

UNITED STATES PATENTS

| | | |
|---|---|---|
| 1,669,271 | Webb | May 8, 1928 |
| 2,288,599 | Ramsaur | July 7, 1942 |
| 2,405,831 | Jensen | Aug. 13, 1946 |
| 2,584,877 | Hoffman et al. | Feb. 5, 1952 |